(12) United States Patent
Sun et al.

(10) Patent No.: US 6,734,976 B2
(45) Date of Patent: May 11, 2004

(54) METHOD AND SYSTEM FOR MEASURING AN ULTRASHORT OPTICAL PULSE

(75) Inventors: Chi-Kuang Sun, Taipei (TW); Tzu-Ming Liu, Keelung (TW); Yin-Chieh Huang, Taipei (TW); Gia-Wei Chern, Chiai (TW)

(73) Assignee: National Taiwan University, Taipei (TW)

( * ) Notice: Subject to any disclaimer, the term of this patent is extended or adjusted under 35 U.S.C. 154(b) by 98 days.

(21) Appl. No.: 10/096,682

(22) Filed: Mar. 14, 2002

(65) Prior Publication Data

US 2003/0174335 A1 Sep. 18, 2003

(51) Int. Cl.$^7$ ................................................ G01B 9/02
(52) U.S. Cl. ..................................................... 356/450
(58) Field of Search ................................ 356/450, 451, 356/455

(56) References Cited

U.S. PATENT DOCUMENTS

| | | |
|---|---|---|
| 4,480,192 A | 10/1984 | Albrecht et al. |
| 5,754,292 A | 5/1998 | Kane et al. |
| 6,008,899 A * | 12/1999 | Trebino et al. ............. 356/450 |

OTHER PUBLICATIONS

Liu, Tzu–Ming et al. "Direct Temporal Intensity Measurement of Ultrashort Optical Pulses Using Third–Harmonic-Generation based Triple Correlation". May 6, 2001, Lasers and Electro–Optics 2001. CLEO '01. Technical Digest. pp. 74–75.*

Tsang, Thomas et al. "Frequency–resolved optical grating using third–harmonic generaton". May 28, 1996, Proceedings of Ultrafast Phenomena 1997 OSA Technical Digest Series, vol. 8. pp. 286–288.*

Feurer et al., "Measuring the temporal intensity of ultrashort laser pulses by triple correlation," Applied Physics B, vol. 66, 1998, pp. 163–168.

* cited by examiner

Primary Examiner—Samuel A. Turner
Assistant Examiner—Michael A. Lyons
(74) Attorney, Agent, or Firm—Birch, Stewart, Kolasch & Birch, LLP

(57) ABSTRACT

A method for measuring an ultrashort optical pulse, in which third order autocorrelation of femtosecond ($10^{-15}$ second) optical pulses was realized based on third-harmonic-generation (THG). A THG signal with three fundamental frequency photon contributed from three different split pulses of the ultrashort optical pulse is first generated. The three split pulses have time delays $\tau_1$ and $\tau_2$ in between. Then, the intensity of the THG signal is detected while varying the time delays $\tau_1$ and $\tau_2$ between the split pulses to obtain a triple correlation of the ultrashort optical pulse. The triple correlation and its Fourier transform are used to obtain the magnitude $|\tilde{I}(v)|$ and the phase $\alpha(v)$ of the ultrashort optical pulse intensity in the frequency domain, and the intensity of the ultrashort optical pulse in the time domain $I(t)$ is determined using the magnitude $|\tilde{I}(v)|$ and the phase $\alpha(v)$ by inverse Fourier Transform.

14 Claims, 4 Drawing Sheets

METHOD AND SYSTEM FOR MEASURING AN ULTRASHORT OPTICAL PULSE

BACKGROUND OF THE INVENTION

1. Field of the Invention

The invention relates to a method and system for measuring the intensity and phase of an ultrashort optical pulse using third-harmonic-generation (THG) based triple correlation.

2. Description of the Related Art

Ultrashort optical pulses having width of few femtoseconds has been under development over a period of time. Since electronic devices are too slow to measure temporal evolutions of ultrashort optical pulses, many techniques were developed to retrieve temporal pulse shapes.

For instance, U.S. Pat. No. 4,480,192 to Albrecht et al discloses a method of measuring an ultrashort optical pulse. According to Albrecht et al, the temporal shape of optical pulses that occur repetitively may be measured by generating an optical signal corresponding to a higher order autocorrelation function of the intensity of the pulses. The intensity of the optical mixing-signal corresponding to the autocorrelation function is detected. The optical signal is also variably attenuated to maintain constant the intensity thereof as detected. The optical pulses are measured as a function of the amount of attenuation and their temporal shape may be displayed according to the attenuation of the optical signal which corresponds to the autocorrelation function of the pulses with time.

Another approach of measuring the shape of an ultrashort optical pulse is disclosed in U.S. Pat. No. 5,754,292 to Daniel et al. According to Daniel et al, an ultrashort light pulse is split into a gate pulse and a probe pulse having a time delay with the gate pulse. Then, the gate pulse and the probe pulse are combined to form a signal pulse functionally related to a temporal slice of the gate pulse corresponding to the time delay of the probe pulse. The signal pulse is input to a wavelength selective device to output signal pulse information including intensity vs. frequency information. The time delay is varied to yield an intensity plot for signal intensity vs. wavelength and delay. The shape of the ultrashort light pulse is then extracted from the signal pulse information using an iterative algorithm.

Most of the conventional measuring techniques extract the temporal intensity either by assuming an analytic pulse shape or with the help of iterative algorithm. These techniques rely on either interference or various nonlinear effects including second harmonic-generation (SHG) and/or optical Kerr effect, and can not obtain the shape of the ultrashort optical pulse directly from the measured result.

In view of this, an approach reported by Feurer et al, "*Measuring the temporal intensity of ultrashort laser pulses by triple correlation.*" Appl. Phys. B 66, pp. 163–168 (1998), utilizes the triple correlation of the ultrashort optical pulse to measure its intensity shape. According to Feurer et al, two stage of double-harmonic-generation and sum frequency generation are used to obtain triple correlation and thus the intensity shape of the ultrashort optical pulse. No assumptions on the pulse shape and no iterative algorithms are necessary.

However, Feurer et al do not use a process of third-harmonic-generation (THG) to obtain the intensity shape of the pulse. Furthermore, Feurer et al do not propose the method of obtaining the phase information of the ultrashort optical pulse, thus the complete knowledge of the pulse cannot be obtained.

SUMMARY OF THE INVENTION

In view of the above, an objective of the invention is to provide a method and system for measuring the intensity and phase of an ultrashort optical pulse using third-harmonic-generation based triple correlation.

Another objective of the invention is to provide a method and system for measuring the intensity shape of an ultrashort optical pulse without using an iterative algorithm.

To achieve the above objectives, the invention proposes a method for measuring an ultrashort optical pulse. A third-harmonic-generation (THG) signal with three fundamental frequency photon contributed from three different split pulses of the ultrashort optical pulse is firstly generated. The three split pulses have time delays $\tau_1$ and $\tau_2$ in between. The intensity of the THG signal is then detected while varying the time delays $\tau_1$ and $\tau_2$ between the split pulses to obtain a triple correlation of the ultrashort optical pulse. The triple correlation and its Fourier transform are used to obtain the magnitude $|\tilde{I}(v)|$ and the phase $\alpha(v)$ of the ultrashort optical pulse intensity in the frequency domain, and the intensity of the ultrashort optical pulse in the time domain I(t) is determined using the magnitude $|\tilde{I}(v)|$ and the phase $\alpha(v)$.

According to one aspect to the invention, the spectrum of the ultrashort optical pulse may be measured for obtaining phase information. An initial phase $\alpha_0(t)$ may be provided to obtain an initial guess of the ultrashort optical pulse in the time domain E(t) according to previously obtained I(t). Then, a Fourier transform is performed to E(t) to obtain E(v). After reserving the phase part of E(v) and substituting $|E(v)|$ with the square root of the measured spectrum $\sqrt{S(v)}$, an inverse Fourier transform is performed to E(v) to obtain the electric field information of the ultrashort optical pulse in the time domain E($\tau$). After substituting $|E(\tau)|$ with $\sqrt{I(t)}$, an error is calculated by calculating root-mean of squared-difference between I(t) and recovered intensity $|E(\tau)|^2$. The iterative algorithm is repeated and the phase is rotated when error goes to a steady value. Until the error is smaller than a threshold value, the complete information of the laser pulse can thus be obtained.

According to the invention, the intensity shape of an ultrashort optical pulse in the time domain can be obtained using third-harmonic-generation based triple correlation. The phase information can be calculated using the intensity shape obtained and an iterative algorithm of only O(n) complexity. Therefore, no assumptions on the analytic form of the pulse shape and no iterative algorithms are necessary for obtaining the intensity shape of an ultrashort optical pulse. The intensity shape can be obtained directly from the analytic solution.

The invention also provides a system for realizing the above-mentioned method. The system includes a beam splitter, a time-delay controller, a THG crystal, selecting means and a detector. The beam splitter splits the ultrashort optical pulse into three split pulses, and the time-delay controller delays two of the three split pluses to produce the time delays $\tau_1$ and $\tau_2$. The THG crystal interacts with the three split pluses, and the selecting means selects a THG signal from the THG crystal with three fundamental frequency photon contributed from three split pulses, respectively. The detector detects the intensity of the THG signal while varying the time delays $\tau_1$ and $\tau_2$ to obtain a triple correlation of the ultrashort optical pulse. As mentioned above, the triple correlation and its Fourier-transform are used to obtain the magnitude $|\tilde{I}(v)|$ and the phase $\alpha(v)$ of the ultrashort optical pulse in the frequency domain; and the intensity of the ultrashort optical pulse in the time domain I(t) is determined by inverse Fourier-transform of $|\tilde{I}(v)|e^{j\alpha(v)}$.

The time-delay controller may include an electric-driven Galvanometer or slidable stages mounted with retro-reflector. The detector may include a spectrometer with a CCD camera, a photo multiplier tube (PMT), or a semiconductor optical detector.

Further scope of the applicability of the invention will become apparent from the detailed description given hereinafter. However, it should be understood that the detailed description and the specific example, while indicating preferred embodiment of the invention, are given by way of illustration only, since various changes and modifications within the spirit and scope of the invention will become apparent to those skilled in the art from the detailed description.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The objectives and advantages of the invention will be apparent from the following detailed description, which proceeds with reference to the accompanying drawings, wherein the same references relate to the same elements.

Figure 1:
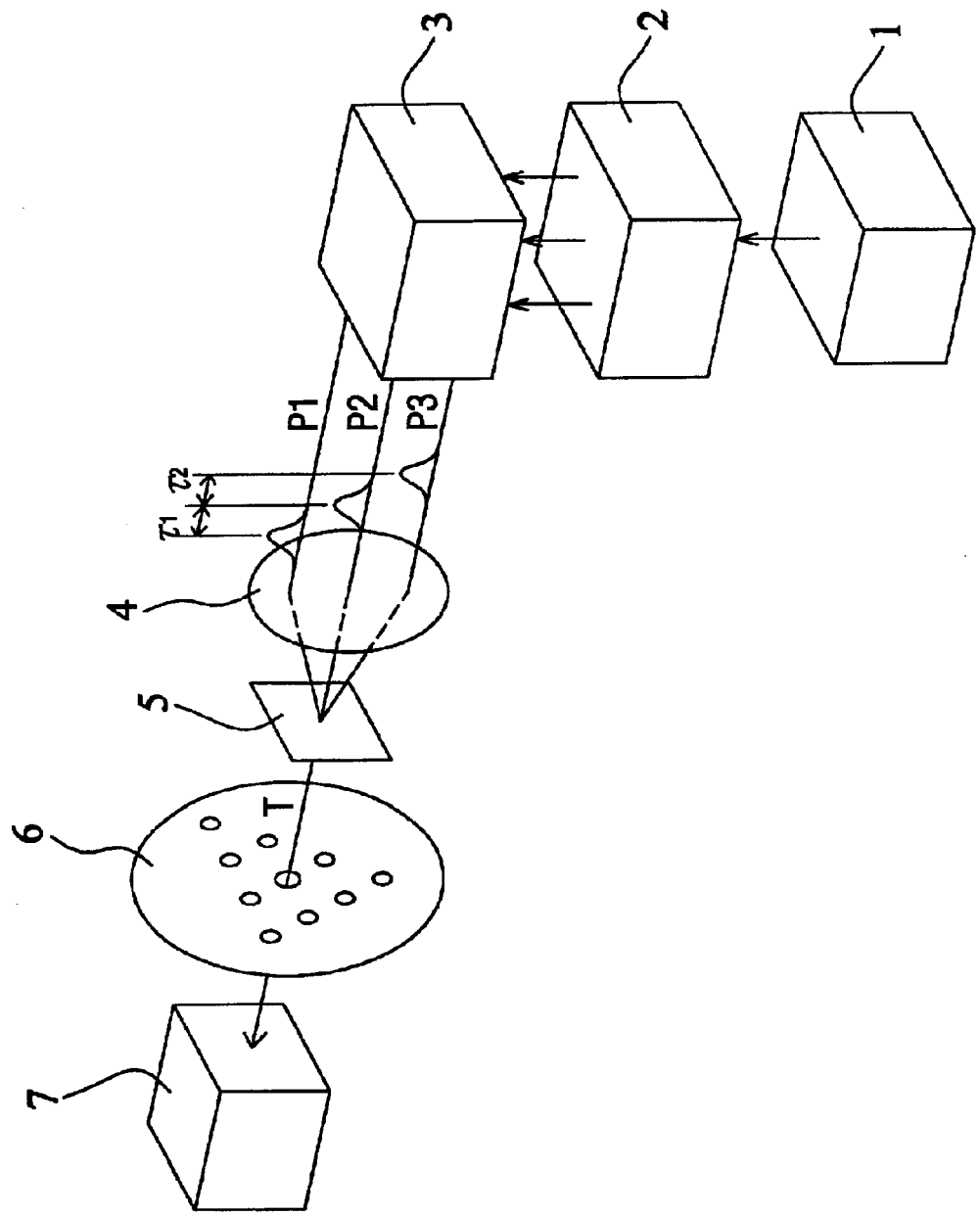
FIG. 1 is a schematic view showing the system for measuring an ultrashort optical pulse according to the preferred embodiment of the invention.

Referring to FIG. 1, the system for measuring an ultrashort optical pulse according to a preferred embodiment of the invention includes an optical source 1, a beam splitter 2, a time-delay controller 3, an objective lens 4, a third-harmonic-generation (THG) crystal 5, an iris 6, and a detector 7. The optical source 1 can be a Cr:forsterite laser, or any other optical source that can generate an ultrashort optical pulse P.

The beam splitter 2 splits an ultrashort optical pulse P into three split pulses P1, P2 and P3. The time-delay controller 3 receives the split pulses P1, P2 and P3, and can vary the time delays $\tau_1$ and $\tau_2$ between the split pulses. In the preferred embodiment, the time-delay controller 3 utilizes conventional electric-driven Galvanometer to vary the time delays $\tau_1$ and $\tau_2$. However, it should be noted that one ordinary skilled in the art may choose equivalent alternatives, such as slidable stages mounted with retroreflectors, to vary the time delays $\tau_1$ and $\tau_2$ between the split pulses without departing from the scope of the invention.

The objective lens 4 focuses the split pulses P1, P2 and P3 to the THG crystal 5. The THG crystal may be a p-type gallium nitride with a 0.45 µm thickness. The THG signal T with three fundamental frequency photon contributed from the split pulses P1, P2 and P3 respectively is spatially selected with the iris 6 according to momentum conservation law.

The detector 7 receiving the THG signal T may be a spectrometer with a CCD camera, a photo multiplier tube (PMT), or a semiconductor optical detector. By varying the time delays $\tau_1$ and $\tau_2$ between the split pulses using the time-delay controller 3, the background-free triple correlation $G^3(\tau_1,\tau_2)$ can be directly measured by the detector 7:

$$G^3(\tau_1,\tau_2)=\int I(t)I(t+\tau_1)I(t+\tau_2)dt$$

Then, the bispectrum $\tilde{G}^3(v_1,v_2)$, i.e., the Fourier transform of the triple correlation can be used to calculate the magnitude $|\tilde{I}(v)|$ of the ultrashort optical pulse intensity in the frequency domain:

$$|\tilde{I}(v)|=\sqrt{\tilde{G}^3(v_1,0)/\tilde{I}(0)}$$

The phase $\alpha(v)$ of the ultrashort optical pul_seintensity in the frequency domain can be derived directly from the triple correlation $\tilde{G}^3(\tau_1,\tau_2)$:

$$\alpha(v) = \int_0^v \alpha'(v_1)dv_1$$

$$= -2\pi \int_0^v \left( \frac{\int \tau_2 \cos(2\pi v_1 \tau_1) G^3(\tau_1,\tau_2) d\tau_1 d\tau_2}{\int \cos(2\pi v_1 \tau_1) G^3(\tau_1,\tau_2) d\tau_1 \tau_2} \right) dv_1$$

Thus, the intensity I(t) of the ultrashort optical pulse P can be determined by the following equation:

$$I(t)=\int |\tilde{I}(v)|\exp(i\alpha(v)-i2\pi vt)dv$$

Figures 2A, 2B:
FIGS. 2A and 2B are plots showing two examples of the obtained triple correlation traces of the ultrashort optical pulse.
Figure 3B:
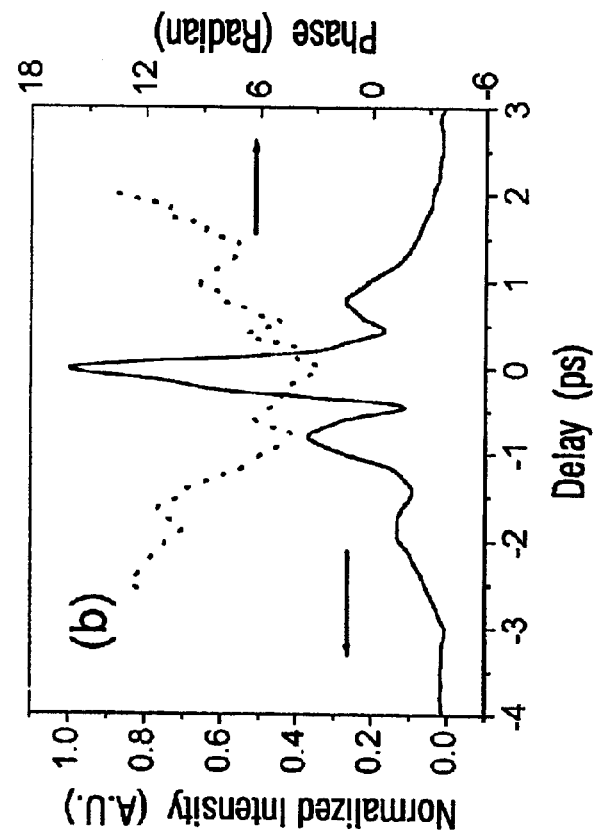
FIGS. 3A and 3B are diagrams showing the corresponding temporal intensity and phase of the ultrashort optical pulse, whose mathematical autocorrelations agree with the measured ones based on a conventional SHG autocorrelator.
Figure 3A:
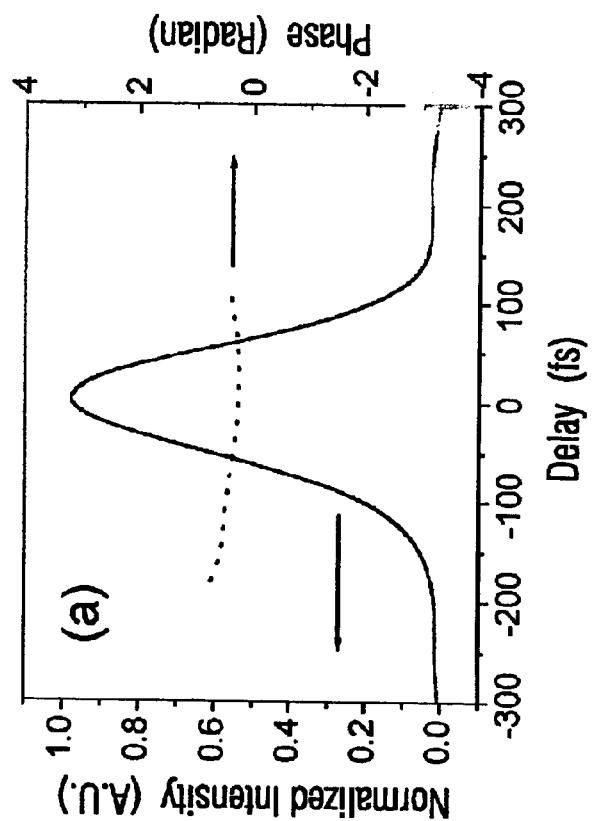

FIGS. 2A and 2B show two examples of the obtained triple correlation traces of the ultrashort optical pulse P using a GaN thin film as the THG crystal 5. The laser wavelength is centered at 1230 nm. In order to distinguish the THG signal T from other photoluminescence signals, a CCD-based spectrometer is used as the detector 7. Diagonally symmetric traces were obtained, which is the characteristic of triple correlation. The corresponding temporal intensity of the ultrashort optical pulse P shown in FIGS. 3A and 3B respectively, whose mathematical autocorrelations agree with the measured ones based on a conventional SHG autocorrelator.

Figure 4:
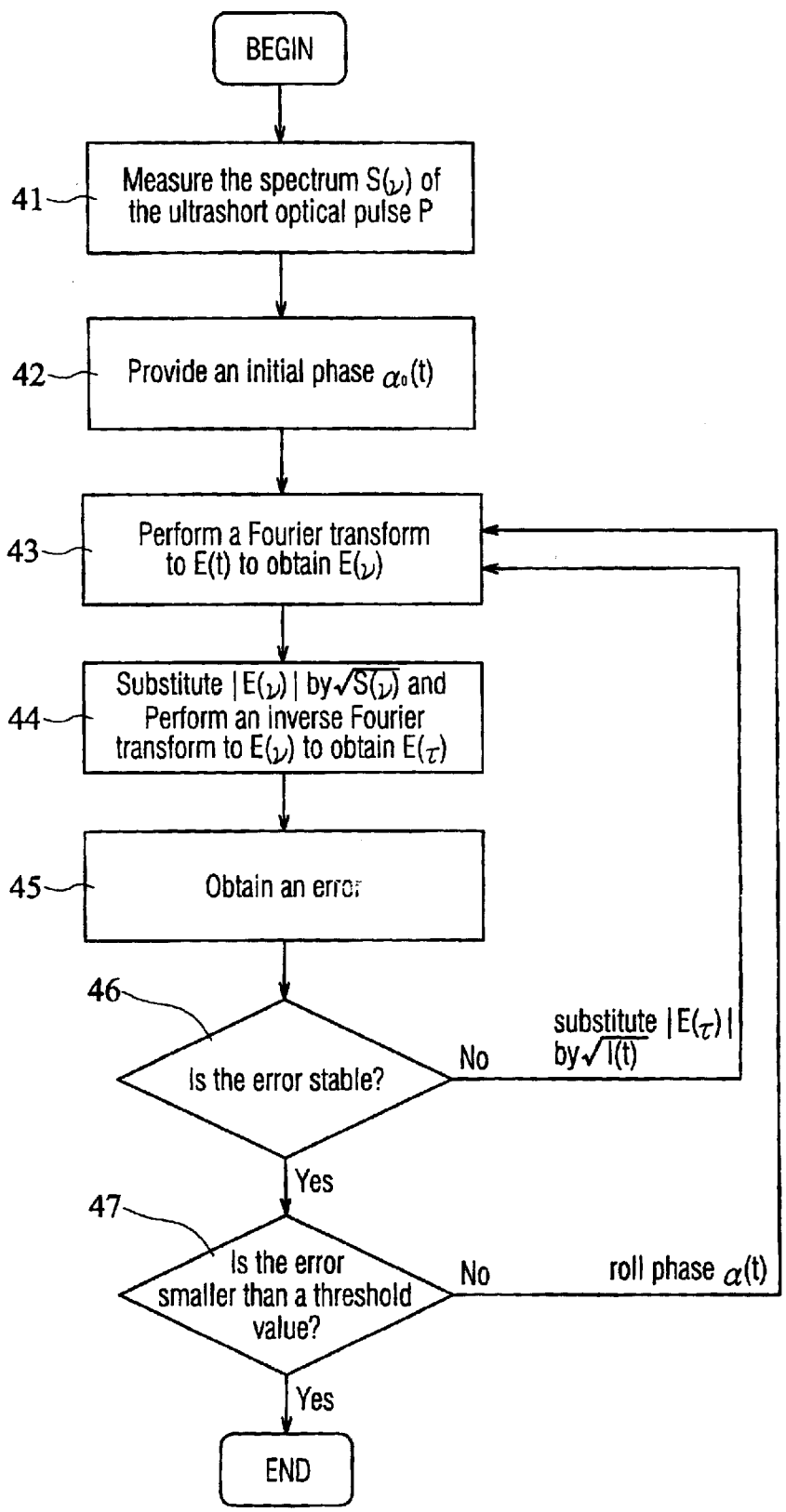
FIG. 4 is a flowchart showing the steps of determining the phase of the ultrashort optical pulse.

In order to retrieve the corresponding phase information of the ultrashort optical pulse P, a simple algorithm is also developed based on the directly obtained optical pulse temporal intensity profile with the aid of a direct optical spectrum measurement. Referring to FIG. 4, the spectrum S(v) of the ultrashort optical pulse P is measured in step 41 while measuring the temporal intensity of the ultrashort optical pulse P. Then, an initial phase $\alpha_0(t)$ is provided in step 42 to obtain an initial guess of the ultrashort optical pulse P in the time domain E(t) according to the previously obtained I(t).

In step 43, a Fourier transform is performed to E(t) to obtain the electric field of the ultrashort optical pulse in the frequency domain, i.e. E(v). In step 44, |E(v)| is substituted by the square root of the measured spectrum $\sqrt{S(v)}$, and an inverse Fourier transform is performed to E(v) to obtain the intensity of the ultrashort optical pulse in the time domain E($\tau$). In step 45, an error $\epsilon$ is obtained by calculating root-mean of squared-difference between recovered intensity $|E(\tau)|^2$ and previously obtained intensity I(t):

$$\varepsilon \equiv \left\{ \frac{1}{N} \sum_1^N [|E(t_i)|^2 - I(t_i)]^2 \right\}^{1/2}$$

If the error is not stable in step 46, |E($\tau$)| will be substituted by $\sqrt{I(t)}$, and the algorithm is returned to step 43. If the error is stable in step 46, but not smaller than the threshold value in step 47, the phase $\alpha(t)$ will be rolled with an angle large enough to avoid the local minimum and the algorithm will be returned to step 43. If the error $\epsilon$ is stable in step 46, and is smaller than a threshold value in step 47, then the algorithm is over, and the phase information of the ultrashort optical pulse P is obtained.

Since the intensity shape of an ultrashort optical pulse in the time domain can be obtained using THG based triple correlation, no assumptions on the analytic form of the pulse shape and no iterative algorithms are necessary for obtaining the intensity shape of an ultrashort optical pulse. The intensity shape can be obtained directly from the analytic solution.

Furthermore, the phase information can be calculated using the intensity shape obtained, a measured spectrum, and an iterative algorithm of only O(n) complexity. Therefore, the complete information of an ultrashort optical pulse can be obtained.

While the invention has been described with reference to a preferred embodiment, this description is not intended to be construed in a limiting sense. Various modifications of the embodiment will be apparent to persons skilled in the art upon reference to the description. It is therefore intended that the appended claims encompass any such modifications.

What is claimed is:

1. A method for measuring an ultrashort optical pulse, comprising:

generating a third-harmonic-generation (THG) signal with three fundamental frequency photon contributed from three different split pulses of the ultrashort optical pulse having time delays $\tau_1$ and $\tau_2$ in between;

detecting the intensity of the THG signal while varying the time delays $\tau_1$ and $\tau_2$ between the split pulses to obtain a triple correlation of the ultrashort optical pulse;

obtaining the magnitude $|\tilde{I}(v)|$ of the ultrashort optical pulse intensity in the frequency domain using the Fourier transform of the triple correlation;

obtaining the phase $\alpha(v)$ of the ultrashort optical pulse in the frequency domain using the triple correlation; and determining the intensity of the ultrashort optical pulse in the time domain I(t) using the magnitude $|\tilde{I}(v)|$ and the phase $\alpha(v)$.

2. The method according to claim 1, further comprising:

(a) measuring a spectrum S(v) of the ultrashort optical pulse;

(b) providing an initial phase $\alpha_0(t)$ to obtain an initial intensity of the ultrashort optical pulse in the time domain E(t) according to I(t) obtained in claim 1;

(c) performing a Fourier transform to E(t) to obtain the intensity of the ultrashort optical pulse in the frequency domain $|E(v)|$;

(d) substituting $|E(v)|$ with the square root of the measured spectrum $\sqrt{S(v)}$;

(e) performing an inverse Fourier transform to E(v) to obtain the electric field of the ultrashort optical pulse in the time domain E($\tau$);

(f) calculating an error $\epsilon$ between the recovered intensity $|E(\tau)|^2$ and the previously measured intensity I(t); and (g) substituting $|E(\tau)|$ with $\sqrt{I(t)}$;

(h) rolling the phase $\alpha(t)$ and repeating the steps (c) to (g) until the error is smaller than a threshold value.

3. The method according to claim 1, wherein the generating step comprises:

splitting the ultrashort optical pulse into the three split pulses;

delaying two of the three split pluses to produce the time delays $\tau_1$ and $\tau_2$;

focusing the three split signals on a THG crystal; and selecting the THG signal from the THG crystal with an iris according to momentum conservation law.

4. The method according to claim 1, wherein the obtaining of the spectral magnitude $|\tilde{I}(v)|$ of the ultrashort optical pulse intensity is accomplished using the following equation:

$$|\tilde{I}(v)|=\sqrt{\tilde{G}^3(v_1,0)/\tilde{I}(0)}.$$

5. The method according to claim 1, wherein the obtaining of the spectral phase $\alpha(v)$ of the ultrashort optical pulse intensity is accomplished using the following equation:

$$\alpha(v) = \int_0^v \alpha'(v_1) dv_1$$
$$= -2\pi \int_0^v \left( \frac{\int \tau_2 \cos(2\pi v_1 \tau_1) G^3(\tau_1, \tau_2) d\tau_1 d\tau_2}{\int \cos(2\pi v_1 \tau_1) G^3(\tau_1, \tau_2) d\tau_1 d\tau_2} \right) dv_1.$$

6. The method according to claim 1, wherein the determining step is accomplished using the following equation:

$$I(t)=\int |\tilde{I}(v)| \exp(i\alpha(v)-i2\pi v t) dv.$$

7. A system for measuring an ultrashort optical pulse, comprising:

a beam splitter for splitting the ultrashort optical pulse into three split pulses;

a time-delay controller for delaying two of the three split pluses to produce the time delays $\tau_1$ and $\tau_2$;

a THG crystal for interacting with the three split pluses;

selecting means for selecting a THG signal from the THG crystal with three fundamental frequency photon contributed from three different split pulses; and a detector for detecting the intensity of the THG signal while varying the time delays $\tau_1$ and $\tau_2$ to obtain a triple correlation of the ultrashort optical pulse, wherein the triple correlation and its Fourier transform are used to obtain the magnitude $|\tilde{I}(v)|$ and the phase $\alpha(v)$ of the ultrashort optical pulse intensity in the frequency domain; and the intensity of the ultrashort optical pulse in the time domain I(t) is determined using the magnitude $|\tilde{I}(v)|$ and the phase $\alpha(v)$.

8. The system according to claim 7, further comprising:

an objective lens for focusing the three split signals on the THG crystal.

9. The system according to claim 7, wherein the time-delay controller includes an electric-driven Galvanometer.

10. The system according to claim 7, wherein the time-delay controller includes slidable stages mounted with retro-reflectors.

11. The system according to claim 7, wherein the detector includes a spectrometer with a CCD camera.

12. The system according to claim 7, wherein the detector includes a photo multiplier tube (PMT).

13. The system according to claim 7, wherein the detector includes a semiconductor optical detector.

14. The system according to claim 7, wherein the detector further measures a spectrum S(v) of the ultrashort optical pulse.

* * * * *